UNITED STATES PATENT OFFICE.

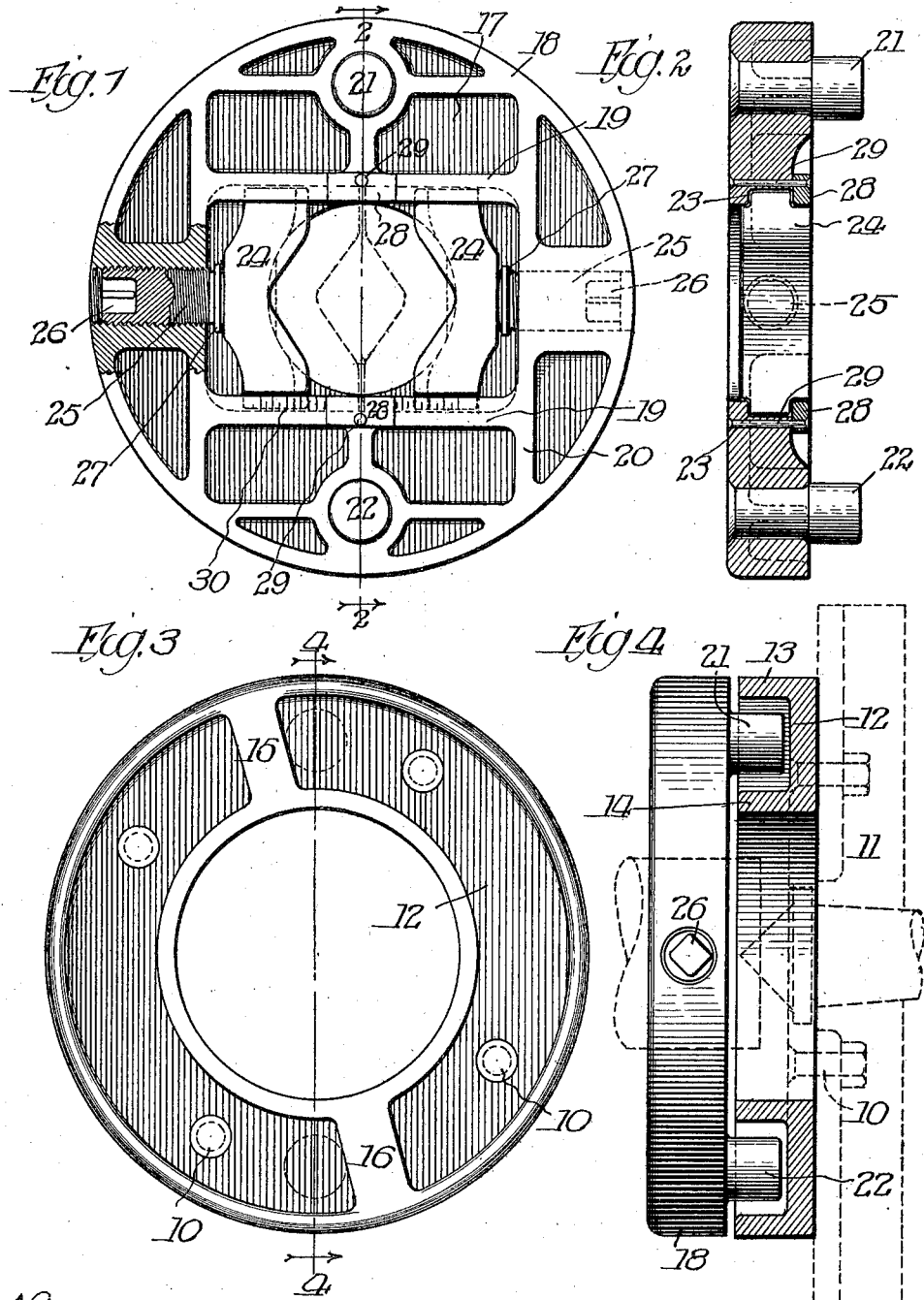

MATHEW ROSS, OF CHICAGO, ILLINOIS.

LATHE-DOG.

1,032,705.  Specification of Letters Patent.  Patented July 16, 1912.

Application filed December 22, 1911. Serial No. 667,343.

*To all whom it may concern:*

Be it known that I, MATHEW ROSS, a citizen of the United States, and resident of Chicago, in the county of Cook and State of Illinois, have invented certain new and useful Improvements in Lathe-Dogs, of which the following is a specification.

My invention relates to lathes and has particular reference to a novel lathe dog for use in connection therewith.

In the operation of lathes it is necessary to employ some means to cause the rotation of the work with the driving mechanism of the lathe. This is usually accomplished by means of an appliance called a lathe dog which is adapted to be clamped to the work by means of set screws or otherwise, the clamp having a right angled projection engaging with one of the recesses in the lathe head. In many of the lathe dogs heretofore in use there have been projections such as the head of the set-bolt, etc., which are liable to and often do catch in the clothing of the operator and cause serious accidents.

One object of my invention is to produce a lathe dog which shall have no projecting parts, being preferably circular in outline.

A further object is to provide such a lathe dog having at least two points of engagement with the driving means. Heretofore as far as I am aware the driving has been accomplished through one engaging point or projection, thus throwing an unequal or torsional strain on the dog. This necessitates naturally a much more forcible engagement between the dog and the work. This engagement is often difficult without injuring or defacing the work.

A further object is to provide a lathe dog having a large capacity. This is accomplished by the arrangement of the clamps as shown. Furthermore, by the use of such clamps a four-point contact with the work is secured instead of three-point as has been heretofore the practice.

Other objects and advantages will appear hereinafter and be specifically pointed out in the claims.

My invention will be more readily understood by reference to the accompanying drawings, wherein, Figure 1 is a face view of the clamping or driven member of my lathe dog; Fig. 2 is a section on the line 2—2 of Fig. 1; Fig. 3 is a face-view of the driving member of the dog and, Fig. 4 is a side elevation of the driven member as shown in Fig. 1, and a section on the line 4—4 of Fig. 3, through the driving member.

Referring more particularly to the drawings it will be seen that my novel dog is composed of two parts, there being means for removably interlocking the one with the other. The driving member is secured by suitable bolts 10, to a lathe head 11, of any well known form. This driving member is composed of a preferably circular web 12 of metal having an outer peripheral flange 13 and an inner flange 14. The flanges 13, 14 are united at two points by radial webs or abutments 15, 16. In practice this member is securely bolted to the lathe head and is not removed except for repairs or replacement.

The driven or clamping member of the dog is composed of a web of metal 17 having a peripheral flange 18 and strengthened by the addition of ribs 19, 20, etc. In perforations through the member at opposite sides thereof, I mount steel pins 21, 22, which can be drifted or shrunk in place or the holes may be counter-sunk and the pins riveted in place as desired. Care should be taken, however, that no part of the pin projects through onto the operating face inasmuch as such part might catch in the clothing of the operator. These pins, as shown in Fig. 2, project into the plane of the arc-shaped grooves formed by the flanges 13, 14 and abut against the stops 15, 16, as shown in dotted lines in Fig. 3. Thus a two-point driving engagement is secured. This number of points may be increased if desired although in practice the two-point engagement has been found to be desirable.

As shown in Figs. 1 and 2, the ribs 19 contain grooves 23, within which the clamping members 24 are adapted to slide. These clamping members may be of any approved form, those shown in the drawings having counter-sunk bearings with which a set-bolt 25 coöperates. This bolt has a counter-sunk squared portion 26, with which a tool may coöperate to advance and tighten the clamps. The bolts have, as shown in Fig. 1, a peripheral flange 27 near their inner ends which prevents the withdrawal of the bolts far enough so they would project outside the periphery of the member. By this means the operator is prevented from carelessly withdrawing the bolt to a point where his sleeve might be caught. In order to insert the clamping members I cut away portions 28 from the ribs 19, and after the insertion of the clamps secure the cut-away portions again in place by means of rivets 29. In order that the operator may set the clamps before entering the dog on the work, I may provide graduations 30 on one of the ribs 19.

It will be seen that I have produced a lathe dog as hereindescribed which has in practice but one part to be handled as is the case with the dogs at present in use. However, there is provided a feature of absolute safety, a two-point engagement with the driving member and a four-point engagement with the work. It will be apparent also that none of the parts are loose and adapted to become lost or displaced and that the device is extremely simple, efficient in operation and cheap of manufacture.

I claim:

1. In a lathe, the combination of a head and a dog, said dog being provided with independently operable radially movable clamps, clamp actuating means disposed entirely within the body of said dog, a driver secured to said head, and a plurality of driving connections between said driver and said dog, substantially as described.

2. A lathe dog comprising, in combination, a body substantially circular in outline and provided with driving means on one face, independently operable clamps radially movable in said body, actuating means for said clamps, said actuating means being disposed entirely within the periphery of said dog, substantially as described.

3. A lathe dog comprising, in combination, driving and driven members, both substantially circular in outline, means for rigidly securing said driven member to a lathe head, means for removably engaging the driving and driven members, work clamps independently operable in said driven means, and actuating means for said clamps, said actuating means being wholly disposed within the periphery of said driven member, substantially as described.

MATHEW ROSS.

Witnesses:
ARTHUR W. CLAUSEN,
CHAS. CLAY.

---

Copies of this patent may be obtained for five cents each, by addressing the "Commissioner of Patents, Washington, D. C."